United States Patent
Momoo et al.

(10) Patent No.: US 9,966,099 B2
(45) Date of Patent: May 8, 2018

(54) RECORD PLAYBACK APPARATUS

(71) Applicant: Panasonic Intellectual Property Management Co., Ltd., Osaka (JP)

(72) Inventors: Kazuo Momoo, Osaka (JP); Yuichi Takahashi, Nara (JP); Noritaka Akagi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/610,787

(22) Filed: Jun. 1, 2017

(65) Prior Publication Data
US 2017/0270958 A1    Sep. 21, 2017

Related U.S. Application Data

(63) Continuation of application No. PCT/JP2015/005563, filed on Nov. 6, 2015.

(30) Foreign Application Priority Data

Dec. 4, 2014 (JP) ................................. 2014-245496

(51) Int. Cl.
G11B 15/52 (2006.01)
G11B 7/09 (2006.01)
G11B 7/13 (2012.01)

(52) U.S. Cl.
CPC . *G11B 7/09* (2013.01); *G11B 7/13* (2013.01)

(58) Field of Classification Search
CPC ... G11B 7/0935; G11B 7/0933; G11B 7/0932; G11B 7/0903; G11B 7/1353;
(Continued)

(56) References Cited

U.S. PATENT DOCUMENTS

| 5,010,537 A | 4/1991 | Ohkuma et al. |
| 7,978,570 B2 * | 7/2011 | Suzuki ................. G11B 7/0941 |
| | | 369/112.01 |
| 2009/0316556 A1 | 12/2009 | Suzuki |

FOREIGN PATENT DOCUMENTS

| JP | 64-32431 | 2/1989 |
| JP | 3-203031 | 9/1991 |
| JP | 2010-9636 | 1/2010 |

OTHER PUBLICATIONS

International Search Report dated Jan. 26, 2016 in corresponding International Application No. PCT/JP2015/005563.

* cited by examiner

*Primary Examiner* — Nabil Hindi
(74) *Attorney, Agent, or Firm* — Wenderoth, Lind & Ponack, L.L.P.

(57) ABSTRACT

A record playback apparatus of the present disclosure includes a plurality of optical pickups that records information on a recording medium or plays back information from the recording medium; a single transport mechanism that transports the plurality of optical pickups together; and a transport control circuit that drives the single transport mechanism so that, when the single transport mechanism is driven to transport the plurality of optical pickups to respective target positions on the recording medium, absolute value of a maximum value of transport errors of the plurality of optical pickups with respect to the respective target positions becomes substantially equal to absolute value of a minimum value of transport errors of the plurality of optical pickups with respect to the respective target positions.

4 Claims, 7 Drawing Sheets

(58) Field of Classification Search
CPC .. G11B 27/24; G11B 5/00; G11B 3/38; G11B 27/3027; G11B 3/36; G11B 19/28; G11B 25/02
USPC ......... 369/44.21, 44.22, 44.37, 53.43, 53.42, 369/53.38, 44.14, 44.15, 112.01, 44.27, 369/47.36
See application file for complete search history.

RECORD PLAYBACK APPARATUS

BACKGROUND

1. Technical Field

The present disclosure relates to a record playback apparatus that optically records information on and plays back information from a recording medium.

2. Description of Related Art

Unexamined Japanese Patent Publication No. 2010-9636 discloses a record playback apparatus provided with a head having two-channel optical pickups. This publication discloses that the record playback apparatus includes a slider (transport mechanism) that drives the head mounted with the two optical pickups and that an average value of tracking control signals of the respective optical pickups is used as a control signal of the slider. With this configuration, appropriate slider control can be performed even when one type of the slider drives the head, and high speed recording or playback using the two optical pickups can be realized.

SUMMARY

The present disclosure provides a record playback apparatus that improves record playback quality of an optical pickup in a configuration in which a single transport mechanism transports a plurality of the optical pickups.

A record playback apparatus in the present disclosure includes a plurality of optical pickups that records information on a recording medium or plays back information from the recording medium, a single transport mechanism that transports the plurality of optical pickups together; and a transport control circuit that drives the single transport mechanism so that, when the single transport mechanism is driven to transport the plurality of optical pickups to respective target positions on the recording medium, absolute value of a maximum value of transport errors of the plurality of optical pickups with respect to the respective target positions becomes substantially equal to absolute value of a minimum value of transport errors of the plurality of optical pickups with respect to the respective target positions.

The record playback apparatus of the present disclosure can improve record playback quality of an optical pickup in a configuration in which a single transport mechanism transports a plurality of the optical pickups.

DETAILED DESCRIPTION

Hereinafter, exemplary embodiments are described in detail with appropriate reference to the drawings. However, detailed description beyond necessity may be omitted. For example, detailed description of a matter that has been already known well or overlapping description of a substantially identical configuration may be omitted. This is to avoid unnecessary redundancy of the following description and to make those skilled in the art easily understand the present disclosure.

Note that the attached drawings and the following description are provided in order that those skilled in the art fully understand the present disclosure, and are not intended to limit the subject matter described in the appended claims.

First Exemplary Embodiment

Hereinafter, a first exemplary embodiment is described with reference to FIGS. 1 to 5.

[1-1. Object]

When an optical disk apparatus performs recording and playback on a predetermined track of an optical disk, a transport mechanism transports an optical pickup to a vicinity of the track of the optical disk. After that, the transport mechanism shifts an objective lens of the optical pickup so as to perform a tracking operation for following a target track.

In a configuration where an optical disk apparatus includes a plurality of optical pickups, one transport mechanism may be provided for each of the optical pickups to transport each of the optical pickups independently. However, such transportation is not desirable since size and cost of the optical disk apparatus are increased by the plurality of transport mechanisms.

On the other hand, in a configuration where a single transport mechanism is provided to transport a plurality of optical pickups, a relative distance between the optical pickups should be constant. However, an error occurs in the relative distance between the optical pickups due to accuracy of a component, an adjustment error, fitting looseness, or the like. Consequently, an objective lens of each of the individual optical pickups is shifted so that tracking is performed on a target track.

However, when the objective lens is shifted, record playback quality of the optical disk apparatus can be degraded. Accordingly, it is desirable that an amount of lens shift of the objective lens be as small as possible.

Therefore, an object according to the present exemplary embodiment is to provide an optical disk apparatus that improves record playback quality of an optical pickup in a configuration in which a single transport mechanism transports a plurality of the optical pickups together.

[1-2. Configuration]

Figure 1:
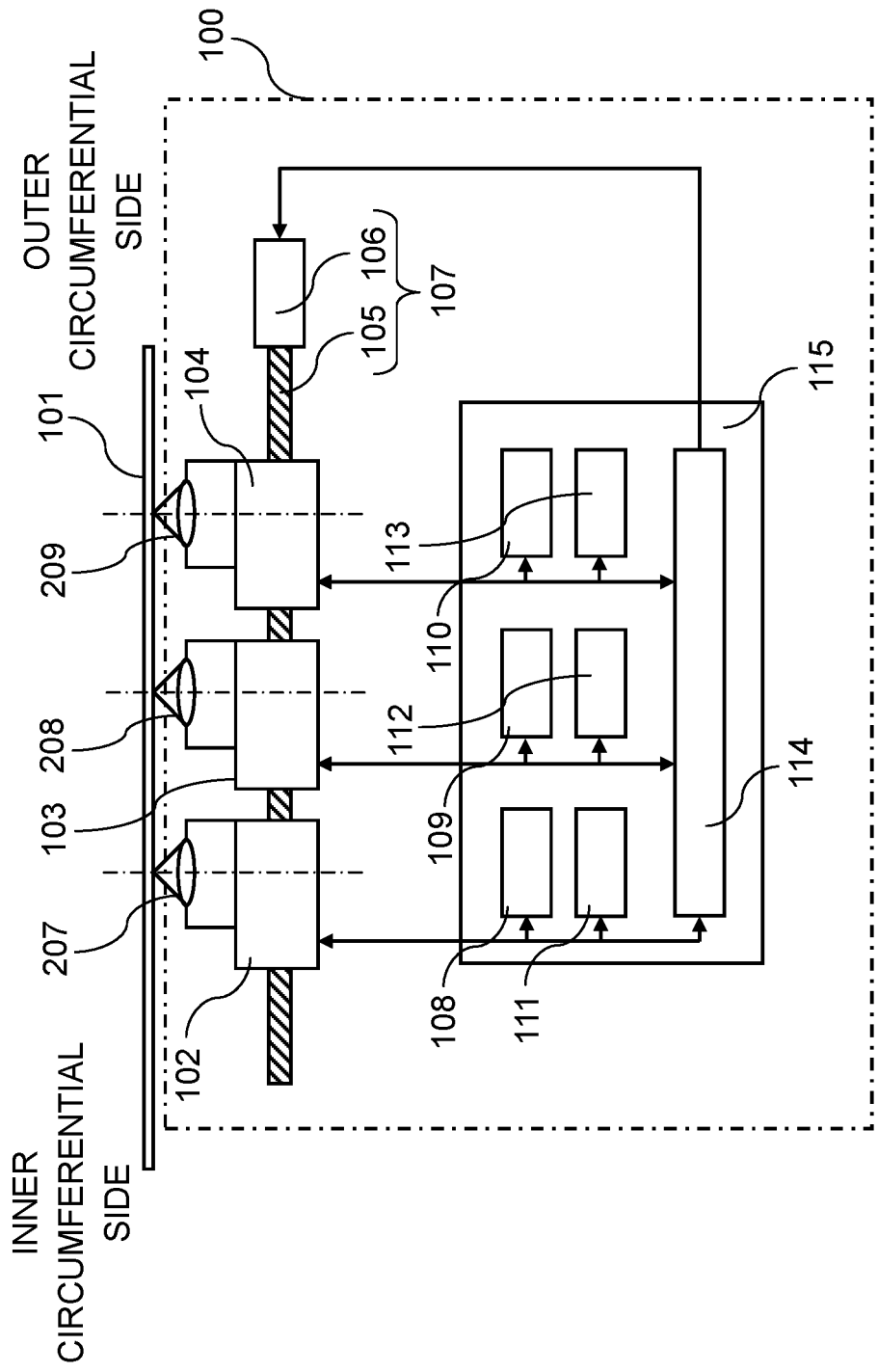
FIG. 1 is a block diagram illustrating a configuration of an optical disk apparatus in a first exemplary embodiment.

FIG. 1 is a block diagram illustrating a configuration of optical disk apparatus 100 in the first exemplary embodiment. Optical disk apparatus 100 includes optical pickups 102, 103, 104, transport device 107, and drive circuit 115. Optical disk apparatus 100 records information on or plays back information from optical disk 101. Here, optical disk apparatus 100 is an example of a record playback apparatus, transport device 107 is an example of a transport mechanism, and optical disk 101 is an example of a recording medium.

Transport device 107 is configured with feed screw 105 and feed motor 106 that drives to rotate feed screw 105. Optical pickups 102, 103, 104 are each provided with a female screw (not shown). Optical pickups 102, 103, 104 are disposed at predetermined intervals in a state in which feed screw 105 is screwed into the female screw.

When optical disk 101 is loaded in optical disk apparatus 100, optical pickups 102, 103, 104 are successively disposed from an inner circumferential side toward an outer circumferential side in a radial direction of optical disk 101. Feed motor 106 of transport device 107 rotates feed screw 105, so that optical pickups 102, 103, 104 are simultaneously transported in the radial direction of optical disk 101. Optical pickups 102, 103, 104 cannot be transported independently, and are transported together by single transport device 107.

Optical pickups 102, 103, 104 each include a light source (not shown) that irradiates optical disk 101 with light and a detector (not shown) that detects light reflected from optical disk 101. The detector includes, for example, four-divided light receiving areas. Each of the light receiving areas generates a detection signal according to the amount of light received, the light which is reflected from optical disk 101. Optical pickups 102, 103, 104 each generate a focusing error signal, a tracking error signal, or the like from the detection signal.

Drive circuit 115 includes focus control circuit 108 and tracking control circuit 111 that control optical pickup 102, focus control circuit 109 and tracking control circuit 112 that control optical pickup 103, focus control circuit 110 and tracking control circuit 113 that control optical pickup 104, and transport control circuit 114.

The focusing error signal and the tracking error signal from optical pickup 102, the focusing error signal and the tracking error signal from optical pickup 103, and the focusing error signal and the tracking error signal from optical pickup 104 are input to drive circuit 115.

The focusing error signal is a signal indicating a focus shift of an optical pickup on a recording surface of optical disk 101. Optical pickups 102, 103, 104 generate the focusing error signals from the detection signals in the respective light receiving areas of the respective detectors through an astigmatic method.

Optical pickups 102, 103, 104 perform focusing operation on optical disk 101 based on the respective focusing error signals. The focusing error signal of optical pickup 102 is input to focus control circuit 108, the focusing error signal of optical pickup 103 is input to focus control circuit 109, and the focusing error signal of optical pickup 104 is input to focus control circuit 110.

Focus control circuit 108 generates a focus drive signal for driving objective lens 207 of optical pickup 102 in a direction to reduce the focusing error signal, and inputs the focus drive signal to optical pickup 102. Focus control circuit 109 generates a focus drive signal for driving objective lens 208 of optical pickup 103 in a direction to reduce the focusing error signal, and inputs the focus drive signal to optical pickup 103. Focus control circuit 110 generates a focus drive signal for driving objective lens 209 of optical pickup 104 in a direction to reduce the focusing error signal, and inputs the focus drive signal to optical pickup 104.

Optical pickup 102 performs the focusing operation on optical disk 101 by driving objective lens 207 according to the focus drive signal. Optical pickup 103 performs the focusing operation on optical disk 101 by driving objective lens 208 according to the focus drive signal. Optical pickup 104 performs the focusing operation on optical disk 101 by driving objective lens 209 according to the focus drive signal.

The tracking error signal is a signal indicating a position shift of the objective lens of the optical pickup relative to a track in the radial direction of optical disk 101. Optical pickups 102, 103, 104 generate the tracking error signals from the detection signals in the respective light receiving areas of the respective detectors, for example, through a push-pull method.

Tracking control circuit 111 generates a tracking drive signal for making objective lens 207 follow the track from the tracking error signal of optical pickup 102, and inputs the tracking drive signal to optical pickup 102. Tracking control circuit 112 generates a tracking drive signal for making objective lens 208 follow the track from the tracking error signal of optical pickup 103, and inputs the tracking drive signal to optical pickup 103. Tracking control circuit 113 generates a tracking drive signal for making objective lens 209 follow the track from the tracking error signal of optical pickup 104, and inputs the tracking drive signal to optical pickup 104.

Optical pickup 102 performs a tracking operation on the track by driving objective lens 207 according to the tracking drive signal. Optical pickup 103 performs the tracking operation on the track by driving objective lens 208 according to the tracking drive signal. Optical pickup 104 performs the tracking operation on the track by driving objective lens 209 according to the tracking drive signal.

A transport error signal is described herein. The transport error signal is a signal indicating a shift amount of objective lens 207, 208, 209 when the tracking operation is performed on a target track by shifting objective lens 207 of optical pickup 102, objective lens 208 of optical pickup 103, or objective lens 209 of optical pickup 104.

In other words, the transport error signal is a signal indicating a distance between the target track and the objective lens in the radial direction of the optical disk when the objective lens is not shifted, that is, a signal indicating a position error. Drive circuit 115 generates the transport error signals indicating the shift amounts of objective lenses 207, 208, 209 from the tracking drive signals for shifting objective lenses 207, 208, 209.

Transport device 107 performs transport control so as to transport optical pickups 102, 103, 104 based on the transport error signals from optical pickups 102, 103, 104. The transport control means transportation of optical pickups 102, 103, 104 so that the shift amount of objective lens 207 of optical pickup 102, the shift amount of objective lens 208 of optical pickup 103, and the shift amount of objective lens 209 of optical pickup 104, namely, the respective transport error signals to optical pickups 102, 103, 104, satisfy predetermined conditions.

Upon performance of the transport control, first, transport control circuit 114 calculates initial target positions of optical pickups 102, 103, 104 so that optical pickups 102, 103, 104 are disposed at radial positions corresponding to the target tracks of optical disk 101. The initial target positions can be calculated from track numbers of the target tracks or the like. Transport control circuit 114 drives transport device 107 so that transport device 107 transports optical pickups 102, 103, 104 to the initial target positions. Optical pickups 102, 103, 104 shift objective lenses 207, 208, 209 to the target tracks through the tracking operation.

Optical pickups 102, 103, 104 then generate the transport error signals from the shift amounts of objective lenses 207, 208, 209, and input the transport error signals to transport control circuit 114. Transport control circuit 114 calculates correction amounts based on the transport error signals. The calculation of the correction amounts is described below in detail. Transport control circuit 114 drives transport device 107 again so that optical pickups 102, 103, 104 are transported from the initial target positions as current positions to correction positions moved by distances indicated by the correction amounts. Along with the transportation of optical pickups 102, 103, 104 to the correction positions, tracking control circuits 111, 112, 113 cause optical pickups 102, 103, 104 to perform the tracking operation so as to shift the lenses, and cause objective lenses 207, 208, 209 to follow the target tracks.

Figure 2:
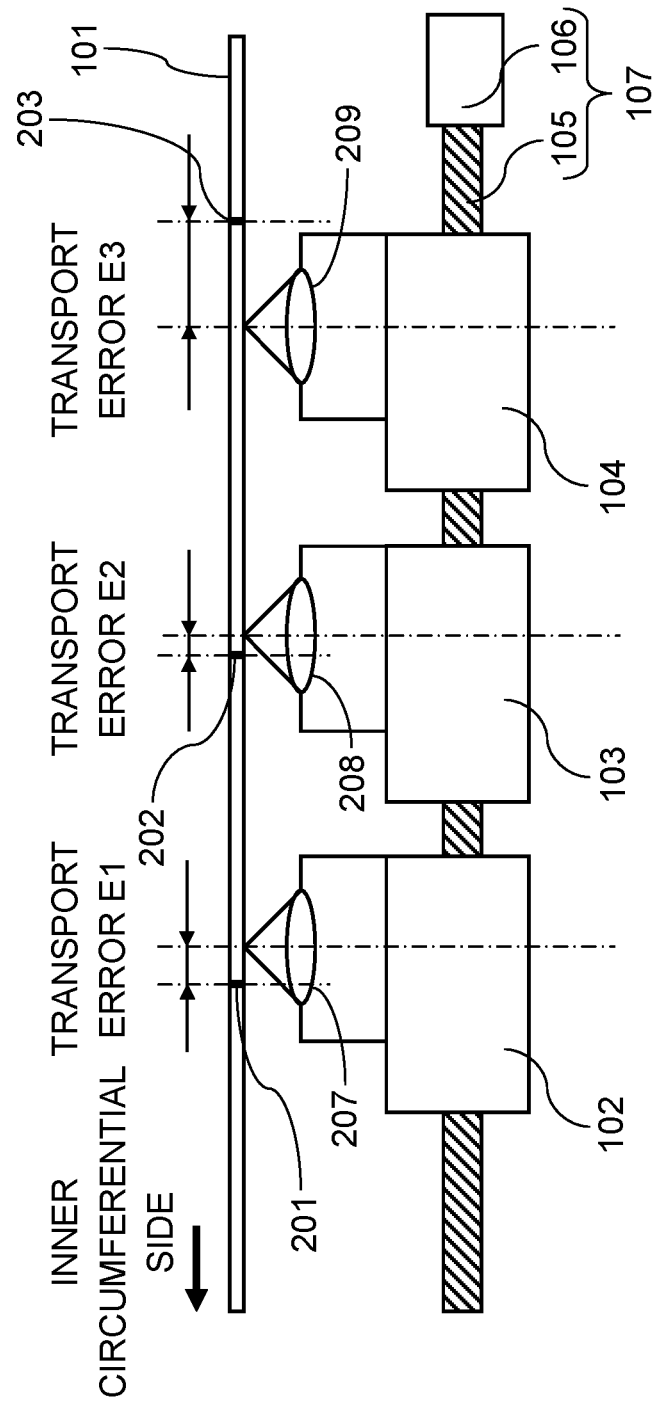
FIG. 2 is an explanatory diagram of transport errors of optical pickups in the first exemplary embodiment.

FIG. 2 is an explanatory diagram of transport errors between optical pickups 102, 103, 104 and the respective target tracks. The plurality of optical pickups 102, 103, 104 is coupled to single transport device 107. Accordingly, an interval between optical pickup 102 and optical pickup 103 and an interval between optical pickup 103 and optical pickup 104 cannot be changed. Fixed values are preset for these intervals.

Further, the target tracks of optical pickups 102, 103, 104 are also tracks separated from each other by a number of tracks corresponding to the interval between optical pickup 102 and optical pickup 103 and the interval between optical pickup 103 and optical pickup 104. For example, in a case of commercially available Blu-ray (registered trademark) disk, a track pitch is 0.32 µm. Accordingly, in a case where the target tracks of optical pickups 102, 103, 104 are respectively separated by 20000 tracks, the interval between optical pickup 102 and optical pickup 103 and the interval between optical pickup 103 and optical pickup 104 may be 0.32 µm×20000=6.4 mm.

However, in the actual optical disk apparatus, for example, an error may occur in the interval between the optical pickups due to accuracy of components of optical pickups 102, 103, 104, an adjustment error, fitting looseness between feed screw 105 and the individual optical pickups, or the like. As illustrated in FIG. 2, when optical pickups 102, 103, 104 are respectively caused to track target tracks 201, 202, 203, these errors cause transport errors E1, E2, E3, respectively.

Figure 3:
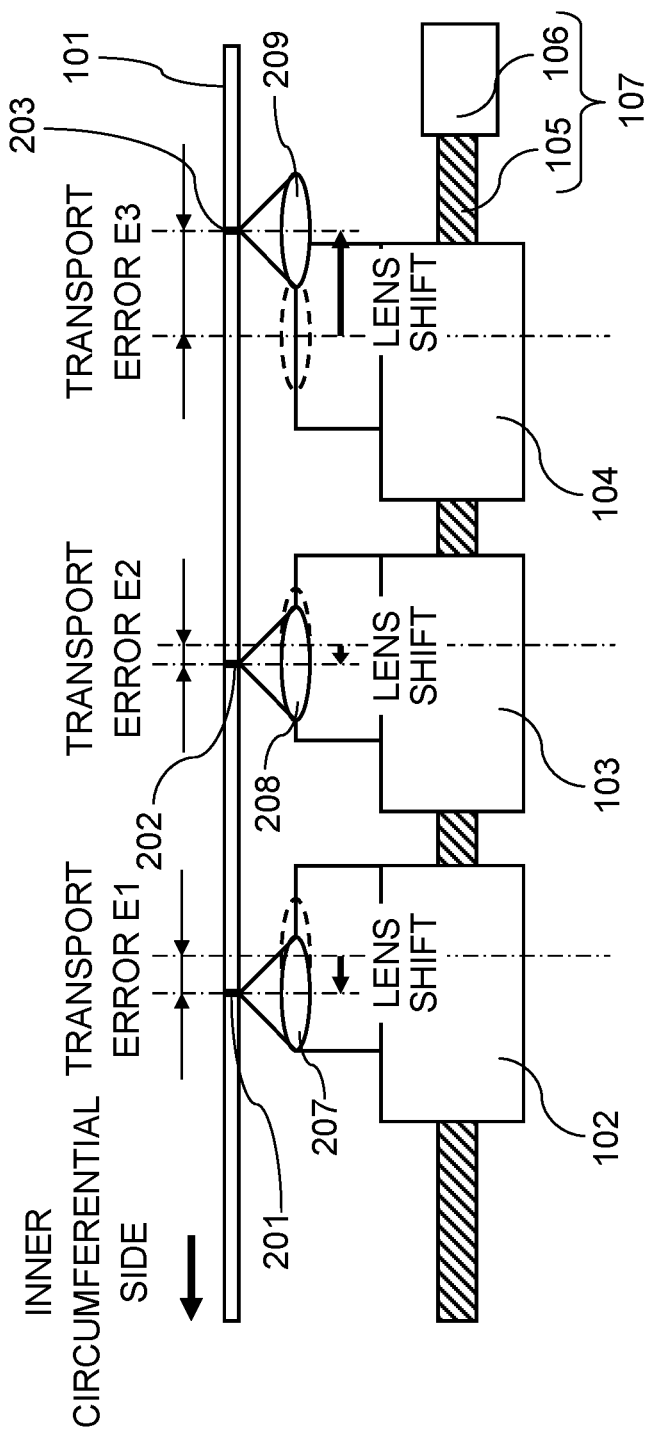
FIG. 3 is an explanatory diagram of lens shifts of the optical pickups in the first exemplary embodiment.

FIG. 3 is an explanatory diagram of lens shifts of the optical pickups. As illustrated in FIG. 3, optical pickups 102, 103, 104 are respectively transported to the initial target positions with respect to target tracks 201, 202, 203. After that, optical pickups 102, 103, 104 shift objective lenses 207, 208, 209 by amounts corresponding to transport errors E1, E2, E3, respectively, so that tracking is performed on the target tracks.

However, the lens shifts of objective lenses 207, 208, 209 can deteriorate various performances of the optical disk apparatus, such as off-track or deterioration of playback signal quality during record and playback, or instability of tracking control caused by an offset caused in the tracking error signal. Therefore, it is desirable that lens shift amounts of objective lenses 207, 208, 209 be as small as possible.

In a configuration in which one optical pickup is installed in one transport device, the transport device can correct a position of the optical pickup and transport the optical pickup so that a transport error is sufficiently small. However, in a configuration in which a plurality of optical pickups is installed in one transport device, it is difficult to minimize respective transport errors simultaneously without performing lens shifts of the objective lenses.

Here, as an example of the transport errors in the initial target positions with respect to the target tracks of optical disk 101 in FIG. 2, the following case is considered:

$$E1 = -20 \text{ µm};$$

$$E2 = -10 \text{ µm; and}$$

$$E3 = +60 \text{ µm}.$$

In this case, the transport error on the inner circumferential side with respect to the target track is represented by a plus (+), and the transport error on the outer circumferential side with respect to the target track is represented by a minus (−).

Figure 4:
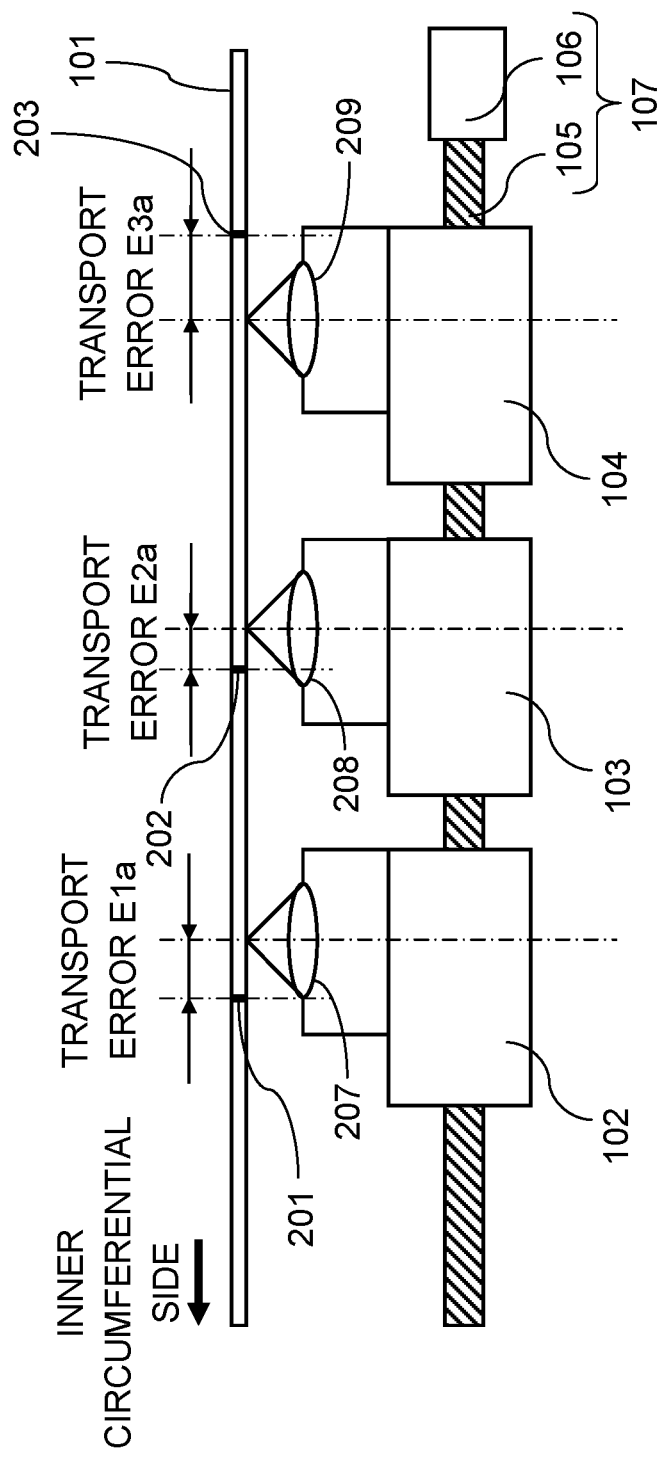
FIG. 4 is an explanatory diagram of transport control of the optical pickups in the first exemplary embodiment.

In order to reduce the transport errors, the optical pickups are transported so that an absolute value of an average value of the transport errors becomes minimum. FIG. 4 is an explanatory diagram of transport control of the optical pickups. In FIG. 4, the transport control of the optical pickups is performed by using an average value of the transport errors of the optical pickups. In FIG. 4, objective lenses 207, 208, 209 are not shifted. The average value of transport errors E1, E2, E3 is obtained by:

$$(E1+E2+E3) \div 3 = (-20-10+60) \div 3 = +10 \text{ µm}.$$

In other words, the average value of the transport errors is 10 µm on the inner circumferential side at the initial target positions when optical pickups 102, 103, 104 are transported to the target tracks. Therefore, when optical pickups 102, 103, 104 are transported to the target tracks, the transportation may be performed by further correcting the target positions by 10 µm toward an outer circumferential side with respect to the initial target positions. Transport errors E1$a$, E2$a$, E3$a$ after the optical pickups are transported to the corrected target positions are obtained respectively by:

$$E1a = E1 - 10 \text{ µm} = -30 \text{ µm};$$

$$E2a = E2 - 10 \text{ µm} = -20 \text{ µm; and}$$

$$E3a = E3 - 10 \text{ µm} = +50 \text{ µm}.$$

At this time, the absolute value of the average value of the transport errors is minimized as follows:

$$|(E1a+E2a+E3a) \div 3| = |(-30-20+50) \div 3| = 0.$$

On the other hand, a maximum value of the absolute value of the transport errors is E3$a$, i.e., 50 µm. Eventually, objective lenses 207, 208, 209 of optical pickups 102, 103, 104 are shifted by amounts corresponding to transport errors E1$a$, E2$a$, E3$a$. Therefore, the lens shift amount becomes 50 µm at a maximum.

On the other hand, in the present exemplary embodiment, when a maximum value and a minimum value of the transport errors at the initial target positions of optical pickups 102, 103, 104 are Emax and Emin, respectively, and a maximum value and a minimum value of transport errors E1, E2, E3 at the corrected target positions are Emax2 and Emin2, respectively, optical pickups 102, 103, 104 are transported so that:

$$|Emax2| = |Emin2|.$$

Figure 5:
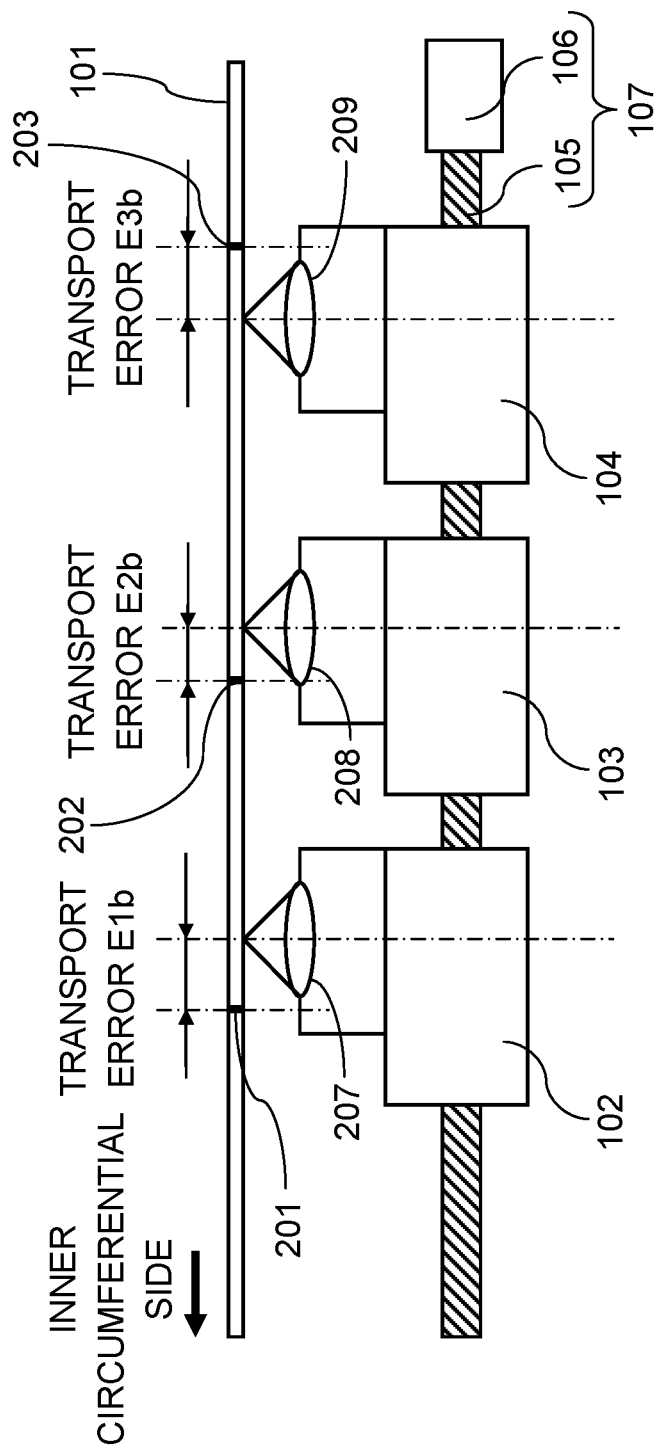
FIG. 5 is another explanatory diagram of transport control of the optical pickups in the first exemplary embodiment.

FIG. 5 is an explanatory diagram of transport control of the optical pickups. In FIG. 5, the transport control of the optical pickups is performed by using the maximum value and the minimum value of the transport errors of the optical pickups. Objective lenses 207, 208, 209 are not shifted. Here, when a correction amount with respect to the initial target position is D, the maximum value Emax2 and the minimum value Emin2 are:

$$Emax2 = Emax + D \text{ and}$$

$$Emin2 = Emin + D.$$

Further, when the maximum value Emax and the minimum value Emin are:

$$Emin = E1 = -20 \text{ µm; and}$$

$$Emax = E3 = +60 \text{ µm}.$$

Accordingly, when D that satisfies |Emax2|=|Emin2| is obtained, the relationship |+60+D|=|−20+D| is established, and therefore the relationship D=−20 μm is obtained.

In other words, in order to obtain |Emax2|=|Emin2|, the plurality of optical pickups 102, 103, 104 should be transported by further correcting the target positions by 20 μm toward the outer circumferential side with respect to the initial target positions upon transportation to the target tracks. Transport errors E1b, E2b, E3b after the optical pickups are transported to the corrected target positions are obtained respectively by:

$$E1b=E1+D=-40 \text{ μm};$$

$$E2b=E2+D=-30 \text{ μm; and}$$

$$E3b=E3+D=+40 \text{ μm}.$$

Eventually, objective lenses 207, 208, 209 of optical pickups 102, 103, 104 are shifted by amounts corresponding to transport errors E1b, E2b, E3b, respectively. Therefore, the lens shift amount becomes 40 μm at a maximum.

In this way, while the transport error at the maximum of 50 μm occurs in the transport control using the average value, only the transport error at the maximum of 40 μm occurs in the transport control in the first exemplary embodiment. The transport control of the plurality of optical pickups can be, therefore, achieved more preferably, and the performance deterioration caused by the lens shifts can be suppressed.

[1-3. Effects]

As described above, in the present exemplary embodiment, optical disk apparatus 100 is provided with: a plurality of optical pickups 102, 103, 104 that records information on optical disk 101 or plays back information from optical disk 101; single transport device 107 that transports the plurality of optical pickups together; and transport control circuit 114 that drives single transport device 107 so that, when single transport device 107 is driven to transport optical pickups 102, 103, 104 to respective target positions on optical disk 101, absolute value of a maximum value of transport errors of the plurality of optical pickups 102, 103, 104 with respect to the respective target positions becomes substantially equal to absolute value of a minimum value of transport errors of the plurality of optical pickups 102, 103, 104 with respect to the respective target positions.

With this configuration, in the configuration in which single transport device 107 transports a plurality of optical pickups 102, 103, 104 together, the maximum value of lens shift amounts of the plurality of optical pickups can be made small. Accordingly, deterioration in various performances of the optical disk apparatus can be reduced. Such deterioration is off-track or deterioration of playback signal quality caused by the lens shifts during record and playback, or instability of tracking control due to an offset caused in a tracking error signal. In other words, optical disk apparatus 100 according to the present exemplary embodiment can improve the record playback quality of the optical pickups.

Second Exemplary Embodiment

[2-1. Configuration]

Figure 6:
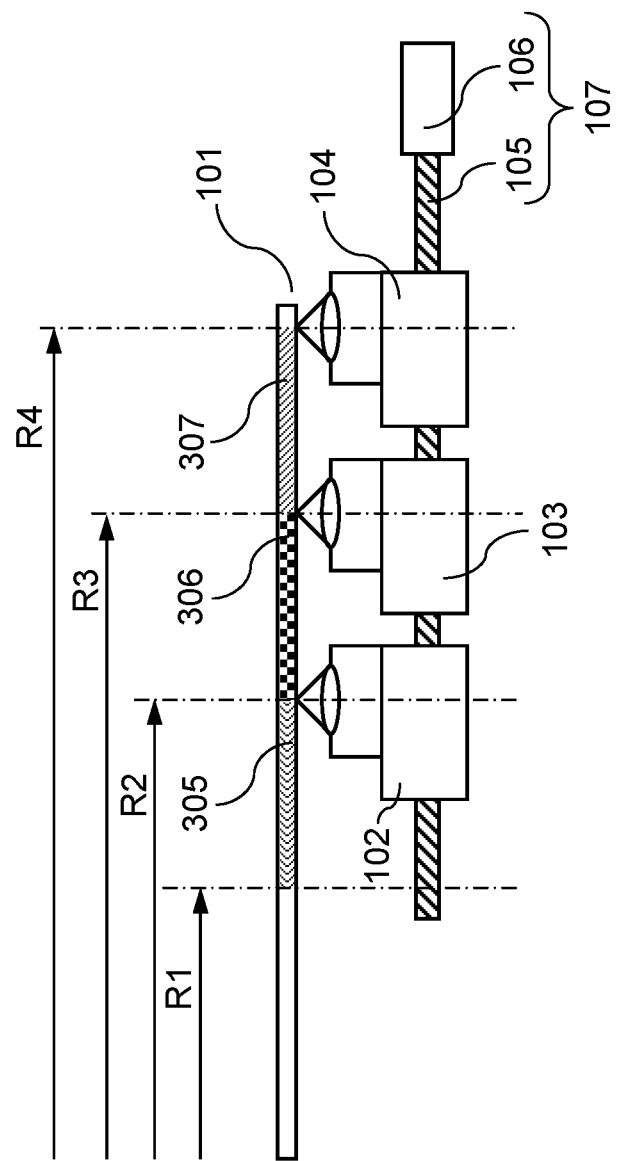
FIG. 6 is an explanatory diagram of transport control of optical pickups in a second exemplary embodiment.

Hereinafter, a second exemplary embodiment is described with reference to FIG. 6.

An optical disk apparatus according to the present exemplary embodiment has the same configuration as the configuration of optical disk apparatus 100 described in the first exemplary embodiment. A method for calculating a correction amount in transport control circuit 114 is different. FIG. 6 is an explanatory diagram of transport control of optical pickups in the optical disk apparatus according to the present exemplary embodiment. As illustrated in FIG. 6, a record playback area of optical disk 101 is divided into three record playback areas 305, 306, 307 in a radial direction. Optical pickup 102 then performs record and playback on record playback area 305, optical pickup 103 performs record and playback on record playback area 306, and optical pickup 104 performs record and playback on record playback area 307. Radii R1, R2, R3, R4 specify boundaries of record playback areas 305, 306, 307. In FIG. 6, optical pickup 102 is disposed in an outermost circumference of record playback area 305, optical pickup 103 is disposed in an outermost circumference of record playback area 306, and optical pickup 104 is disposed in an outermost circumference of record playback area 307.

For example, a diameter of optical disk 101 is 120 mm, and radii of optical disk 101 are: R1=22 mm, R2=34 mm, R3=46 mm, and R4=58 mm, respectively.

Here, optical pickups 102, 103, 104 are disposed at the aforementioned positions, and optical disk 101 rotates at a predetermined rotation speed. In this case, a linear velocity of optical disk 101 with respect to optical pickup 102 and a linear velocity of optical disk 101 with respect to optical pickup 104 are proportional to the respective radii. Accordingly, the linear velocity of optical disk 101 with respect to optical pickup 104 is about 1.7 times faster than the linear velocity of optical disk 101 with respect to optical pickup 102.

Usually, optical disk apparatus 100 is designed so that a mark having substantially equal size is recorded from an inner circumference to an outer circumference of optical disk 101. Accordingly, a transfer rate of a signal to be recorded and played back is substantially proportional to the linear velocity. Therefore, optical pickup 104 records and plays back the signal at a transfer rate 1.7 times faster than the transfer rate of optical pickup 102. Generally, a signal-noise ratio (an S/N ratio) of a signal having a higher transfer rate becomes worse than the S/N ratio of a signal having a lower transfer rate due to a factor, such as a frequency characteristic of a circuit or a bandwidth, thereby often leading to degradation of signal quality. Here, an indicator that represents the signal quality includes jitters, an error rate, Maximum likelihood sequence error estimation (MLSE), and the like of a signal that the optical pickup reads from the optical disk.

Description is given by using the corrected transport errors at the target positions in the first exemplary embodiment. Transport errors E1b, E2b, E3b are respectively:

$$E1b=-40 \text{ μm};$$

$$E2b=-30 \text{ μm; and}$$

$$E3b=+40 \text{ μm}.$$

A lens shift amount of optical pickup 102 and a lens shift amount of optical pickup 104 are 40 μm, and influences of the lens shifts on the signal quality become equal to each other. However, as mentioned above, optical pickup 104 that performs record and playback on the more outer circumferential side may be more disadvantageous in terms of the signal quality due to a difference in the transfer rate caused by the linear velocity. Further, since a linear velocity is higher and surface deflection is larger on the outer circumferential side of the optical disk than the inner circumferential side of the optical disk, the outer circumferential side is disadvantageous also in terms of focusing of the optical pickups and following accuracy of tracking.

In the present exemplary embodiment, an offset is added to the correction amount at the target position in a direction to decrease the lens shift amount of optical pickup 104 on the outer circumferential side so as to make up for the disadvantage of the signal quality of optical pickup 104 on the outer circumferential side. Specifically, offset M is added to transport errors E1b, E2b, E3b so that the transport error of the optical pickup on the outer circumferential side decreases.

For example, when 10 µm of offset M toward the outer circumference, that is, M=−10 µm, is added, corrected transport errors E1c, E2c, E3c are respectively:

$$E1c=E1b+M=-40\ \mu m-10\ \mu m=-50\ \mu m;$$

$$E2c=E2b+M=-30\ \mu m-10\ \mu m=-40\ \mu m;\ \text{and}$$

$$E3c=E3b+M=+40\ \mu m-10\ \mu m=+30\ \mu m.$$

As a result, the signal quality of optical pickup 104 is improved. Conversely, the signal quality of optical pickup 102 is deteriorated. By properly setting offset M to be added to the transport control, the difference in the signal quality caused by the difference in the transfer rate is offset by a change in the signal quality due to the lens shift. Accordingly, the signal quality of the plurality of optical pickups as a whole can be improved. Offset M may be determined by various methods based on a signal quality indicator of the plurality of optical pickups as a whole.

As the signal quality indicator of the plurality of optical pickups as a whole, it is possible to adopt a difference in the signal quality of the plurality of optical pickups (the smaller difference is better); an average value of the signal quality of the plurality of optical pickups (the higher S/N ratio or the lower jitter is better); a lowest value of the signal quality of the plurality of optical pickups (a state where the S/N ratio is low, or a state where the jitter is high), and the like. However, the indicator can be selected in various ways according to a system margin of the optical disk apparatus.

[2-2. Effects]

As described above, in the present exemplary embodiment, optical disk apparatus 100 is provided with: a plurality of optical pickups 102, 103, 104 that records information on optical disk 101 or plays back information from optical disk 101; single transport device 107 that transports the plurality of optical pickups together; and transport control circuit 114 that drives single transport device 107 so that, when single transport device 107 is driven to transport optical pickups 102, 103, 104 to respective target positions on optical disk 101, absolute value of a maximum value of transport errors of the plurality of optical pickups 102, 103, 104 with respect to the respective target positions becomes substantially equal to absolute value of a minimum value of transport errors of the plurality of optical pickups 102, 103, 104 with respect to the respective target positions. Further, transport control circuit 114 drives single transport device 107 so that the absolute value of the maximum value of the transport errors of the plurality of optical pickups 102, 103, 104 becomes substantially equal to absolute value of the minimum value of the transport errors of the plurality of optical pickups 102, 103, 104. Moreover, transport control circuit 114 drives single transport device 107 so that, among the plurality of optical pickups 102, 103, 104, an absolute value of a transport error of a second optical pickup is smaller than an absolute value of a transport error of a first optical pickup. The first optical pickup is located closer to an inner circumferential side than the second optical pickup is, and the second optical pickup is located closer to an outer circumferential side than the first optical pickup is.

With this configuration, in the configuration in which single transport device 107 transports the plurality of optical pickups 102, 103, 104 together, a largest value of lens shift amounts of the plurality of optical pickups is reduced. Further, a difference in signal quality caused by a difference in a transfer rate caused by a difference in a linear velocity in inner and outer circumferences or by a difference in focusing and following accuracy of tracking is offset by a change in the signal quality caused by the lens shifts. Accordingly, the signal quality of the plurality of optical pickups as a whole can be improved. In other words, the optical disk apparatus according to the present exemplary embodiment can improve record playback quality of the optical pickups.

Third Exemplary Embodiment

[3-1. Configuration]

Figure 7:
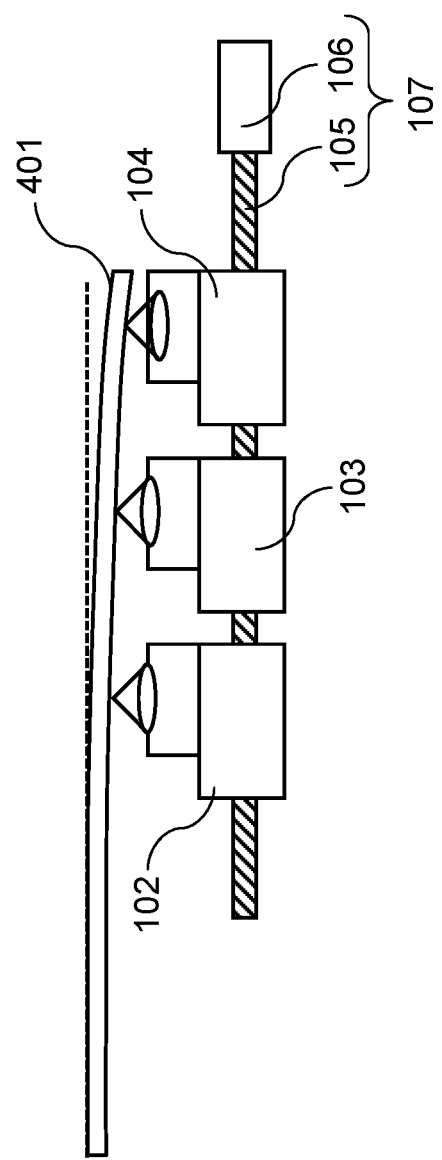
FIG. 7 is an explanatory diagram of transport control of optical pickups in a third exemplary embodiment.

Hereinafter, a third exemplary embodiment is described with reference to FIG. 7.

An optical disk apparatus according to the present exemplary embodiment has the same configuration as the configuration of optical disk apparatus 100 described in the first exemplary embodiment. A method for calculating a correction amount in transport control circuit 114 is different. FIG. 7 is an explanatory diagram of transport control of optical pickups in the present exemplary embodiment. As illustrated in FIG. 7, optical disk 401 loaded in optical disk apparatus 100 is hung down by a warp toward an outer circumference, and surface deflection on an outer circumference is large. Further, although not illustrated in FIG. 7, a track shape of optical disk 401 also has various distortion to an ideal arc shape due to a track cutting error during preparation of an original disk, distortion during molding of the disk, or the like. Optical pickup 104 on the outer circumferential side drives an actuator for objective lens 209 in a tracking direction or a focusing direction so as to follow such track distortion or surface deflection.

When an inner circumference and the outer circumference of optical disk 401 are compared, the outer circumference having a large linear velocity is greatly influenced by the track distortion or the surface deflection. Accordingly, power consumption of the actuator that follows the outer circumference becomes large. A temperature rise of the optical pickup with the large power consumption is large, and an influence of thermal distortion or the like on an optical system is also large. Record playback quality of the optical pickup might be degraded. Moreover, regarding a transport error of the optical pickup, it is necessary to flow an offset current according to a lens shift amount to a tracking drive system of the actuator. Accordingly, power consumption of a tracking system, that is, a tracking driving power, increases, and a temperature rises. Particularly, the optical pickup located on the outer circumferential side tends to be more disadvantageous.

Therefore, in the present exemplary embodiment, the transport control is performed so that a difference in power consumption of the plurality of optical pickups is small, that is, averaged. With this configuration, power consumption of the optical pickup with the high power consumption can be suppressed, and degradation of record playback quality of the optical pickup caused by the temperature rise can be suppressed.

As a specific example of the transport control that reduces a difference in the tracking driving power of the plurality of optical pickups, transport control circuit 114 measures driving current for driving objective lenses 207, 208, 209 of optical pickups 102, 103, 104. Then, based on the measurement result, a transfer amount is corrected so that the driving current of the optical pickup with the largest driving current in optical pickups 102, 103, 104 becomes small. In order to reduce the driving current, for example, the transfer amount is corrected in a direction to reduce the transport error of the optical pickup.

When the power consumption is averaged, power consumption of the entire actuator may be averaged by driving transport device 107 so that a total of the tracking driving power and focusing driving power decreases. For example, the influence of the thermal distortion on the optical system caused by the temperature rise is different depending on a layout of the objective lenses, a tracking coil, and a focusing coil loaded in the actuator. Accordingly, it is desirable that the power consumption be averaged properly according to the influence.

[3-2. Effects]

As described above, in the present exemplary embodiment, optical disk apparatus 100 is provided with: a plurality of optical pickups 102, 103, 104 that records information on optical disk 401 or plays back information from optical disk 401; single transport device 107 that transports the plurality of optical pickups 102, 103, 104 together; and transport control circuit 114 that drives single transport device 107 so that, when single transport device 107 is driven to transport the plurality of optical pickups 102, 103, 104 to target positions on optical disk 401, tracking driving powers of the plurality of optical pickups 102, 103, 104 are equalized.

Further, optical disk apparatus 100 is provided with: a plurality of optical pickups 102, 103, 104 that records information on or plays back information from optical disk 401; single transport device 107 that transports the plurality of optical pickups 102, 103, 104 together; and transport control circuit 114 that drives single transport device 107 so that, when single transport device 107 is driven to transport the plurality of optical pickups 102, 103, 104 to the target positions on optical disk 401, sums of respective tracking driving power and focusing driving power of the plurality of optical pickups 102, 103, 104 are equalized.

With this configuration, degradation of record playback quality of the optical pickup caused by a temperature rise caused by power consumption can be suppressed. In other words, the optical disk apparatus according to the present exemplary embodiment can improve the record playback quality of the optical pickup.

Other Exemplary Embodiments

As mentioned above, the first to third exemplary embodiments have been described as an illustration of the present disclosure. However, the present disclosure is not limited to these exemplary embodiments, and is applicable to any exemplary embodiment where modification, replacement, addition and omission are suitably made. Further, a new exemplary embodiment can be provided by combining the respective components described in the first to third exemplary embodiments.

Accordingly, other exemplary embodiments are illustrated below.

(1) In the above-described exemplary embodiments, the optical pickups are constituted as independent components and are transported together by the single transport device. As long as the optical pickups are transported together, for example, a plurality of optical pickups may be disposed on one base and this base may be transported by a transport device.

(2) The above exemplary embodiments have illustrated a case of the three optical pickups. However, as long as a plurality of optical pickups is provided, a number of optical pickups may be two or more.

(3) In the above-described exemplary embodiments, the optical pickups each include the light source that irradiates optical disk 101 with light and the detector that detects light reflected from optical disk 101, and the detector includes four-divided light receiving areas. The optical pickups each generate the focusing error signal from the detection signal in each of the light receiving areas through the astigmatic method, and generate the tracking error signal through the push-pull method. However, the focusing error signal and the tracking error signal are not limited to these signals, and may be generated by other methods. Further, the transport error signal of each of the optical pickups may be generated by a method for generating tracking driving current or voltage of each optical pickup from a low-pass component passed through a low-pass filter (an LPF), a method for using a position sensor output of an objective lens of each optical pickup in a tracking direction, and the like.

(4) In the second exemplary embodiment, the signal quality of optical pickup 102 and optical pickup 104 is focused. However, the signal quality of optical pickup 103 and optical pickup 104 may be focused. Further, the signal quality of optical pickup 102 and optical pickup 103 may be focused. Further, the signal quality of all optical pickups 102, 103, 104 is focused, and an offset can be set so that the signal quality of the three optical pickups is uniform.

(5) The jitters, the error rate, MLSE, and the like are often used in general as the indicator that represents the signal quality of the individual optical pickups. However, the indicator that represents the signal quality is not limited to these, and may be an indicator that can be detected by any detection system corresponding to the individual optical disk apparatus.

(6) The above exemplary embodiments have illustrated the optical disk apparatus as an example of the record playback apparatus that records on and plays back from a disk-shaped recording medium. The record playback apparatus may be provided with a plurality of optical pickups and a single transport mechanism that transports the plurality of optical pickups. Therefore, the record playback apparatus is not limited to the optical disk apparatus. For example, the record playback apparatus may be an optical tape apparatus that performs record and playback on a tape-shaped recording medium, or an optical card apparatus that performs record and playback on a card-shaped recording medium.

The present disclosure is applicable to a record playback apparatus that optically records and plays back information. Specifically, the present disclosure is applicable to a record playback apparatus or the like in which a plurality of optical pickups records information on and plays back information from a recording medium, such as an optical disk, an optical tape, or an optical card.

What is claimed is:

1. A record playback apparatus comprising:
a plurality of optical pickups that records information on a recording medium or plays back information from the recording medium;
a single transport mechanism that transports the plurality of optical pickups together; and
a transport control circuit that drives the single transport mechanism so that, when the single transport mechanism is driven to transport the plurality of optical pickups to respective target positions on the recording medium, absolute value of a maximum value of transport errors of the plurality of optical pickups with respect to the respective target positions becomes substantially equal to absolute value of a minimum value of transport errors of the plurality of optical pickups with respect to the respective target positions.

2. The record playback apparatus according to claim 1, wherein the transport control circuit drives the single transport mechanism so that the absolute value of the maximum value of the transport errors of the plurality of optical pickups becomes substantially equal to the absolute value of the minimum value of the transport errors of the plurality of optical pickups, and further, the transport control circuit drives the single transport mechanism so that, among the plurality of optical pickups, an absolute value of a transport error of a second optical pickup becomes smaller than an absolute value of a transport error of a first optical pickup, the first optical pickup being located closer to an inner circumferential side than the second optical pickup is, the second optical pickup being located closer to an outer circumference side than the first optical pickup is.

3. A record playback apparatus comprising:
a plurality of optical pickups that records information on a recording medium or plays back information from the recording medium;
a single transport mechanism that transports the plurality of optical pickups together; and
a transport control circuit that drives the single transport mechanism so that, when the single transport mechanism is driven to transport the plurality of optical pickups to target positions on the recording medium, respective tracking driving powers of the plurality of optical pickups are equalized.

4. A record playback apparatus comprising:
a plurality of optical pickups that records information on a recording medium or plays back information from the recording medium;
a single transport mechanism that transports the plurality of optical pickups together; and
a transport control circuit that drives the single transport mechanism so that, when the single transport mechanism is driven to transport the plurality of optical pickups to target positions on the recording medium, sums of respective tracking driving power and focusing driving power of the plurality of optical pickups are equalized.

* * * * *